US007462401B2

(12) United States Patent
Halfyard et al.

(10) Patent No.: US 7,462,401 B2
(45) **Date of Patent: *Dec. 9, 2008**

(54) RADIATION CURABLE COMPOSITION

(75) Inventors: Kurt I. Halfyard, Mississauga (CA); Gordon Sisler, St. Catherines (CA); T. Brian McAneney, Burlington (CA)

(73) Assignee: Xerox Corporation, Norwalk, CT (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/275,333

(22) Filed: Dec. 23, 2005

(65) Prior Publication Data

US 2007/0148414 A1 Jun. 28, 2007

(51) Int. Cl.

| | |
|---|---|
| ***B32B 3/02*** | (2006.01) |
| ***B05D 3/02*** | (2006.01) |
| ***G03G 13/16*** | (2006.01) |

(52) U.S. Cl. .................... 428/500; 428/480; 427/372.2; 430/126.1; 430/126.2

(58) Field of Classification Search ....................... None
See application file for complete search history.

(56) References Cited

U.S. PATENT DOCUMENTS

| | | | | |
|---|---|---|---|---|
| 4,070,262 | A | 1/1978 | Guarino et al. | |
| 4,071,425 | A | 1/1978 | Guarino et al. | |
| 4,072,592 | A | 2/1978 | Due et al. | |
| 4,072,770 | A | 2/1978 | Ting | |
| 4,133,909 | A | 1/1979 | Spencer | |
| 4,265,976 | A | 5/1981 | Nowak | |
| 4,265,990 | A | 5/1981 | Stolka et al. | |
| 4,563,408 | A | 1/1986 | Lin et al. | |
| 4,584,253 | A | 4/1986 | Lin et al. | |
| 4,585,884 | A | 4/1986 | Lin et al. | |
| 5,162,389 | A | 11/1992 | Lee et al. | |
| 5,219,641 | A | 6/1993 | Mehta et al. | |
| 5,223,368 | A | 6/1993 | Ciccarelli et al. | |
| 5,346,795 | A | 9/1994 | Pickering et al. | |
| 5,366,840 | A | 11/1994 | Larson et al. | |
| 5,627,002 | A | 5/1997 | Pan et al. | |
| 5,637,356 | A * | 6/1997 | Kerr et al. | 427/386 |
| 5,800,884 | A | 9/1998 | D'Anna et al. | |
| 5,826,147 | A | 10/1998 | Lin et al. | |
| 5,966,570 | A | 10/1999 | Till et al. | |
| 6,180,308 | B1 | 1/2001 | Pan et al. | |
| 6,187,499 | B1 | 2/2001 | Zhao et al. | |
| 6,212,347 | B1 | 4/2001 | Zhao et al. | |
| 7,166,406 | B2 * | 1/2007 | McAneney et al. | 430/126.1 |
| 2005/0250039 | A1 | 11/2005 | Halfyard et al. | |

* cited by examiner

*Primary Examiner*—Sheeba Ahmed
(74) *Attorney, Agent, or Firm*—Oliff & Berridge, PLC

(57) ABSTRACT

A composition includes at least one radiation curable (alkyl) acrylate-polyester oligomer, at least one photoinitiator, and at least one surfactant, wherein the composition has a viscosity of from about 50 cP to about 3000 cP at about 25° C., and a surface tension of from about 15 to about 40 dynes/cm at about 25° C.

22 Claims, No Drawings

RADIATION CURABLE COMPOSITION

TECHNICAL FIELD

This disclosure is generally directed to compositions for imaging and printing systems like electrostatographic printing systems and devices. The overprint compositions provide a number of advantages to electrostatographic prints, such as, for example, image permanence, thermal stability, lightfastness, and smear resistance. In addition, the overprint compositions reduce document offset.

RELATED APPLICATIONS

Commonly assigned, U.S. patent application Ser. No. 10/838,327 filed May 5, 2004, describes an overprint composition, comprising: a radiation curable oligomer selected from the group consisting of trifunctional unsaturated acrylic resins; a radiation curable monomer selected from the group consisting of polyfunctional alkoxylated or polyalkoxylated acrylic monomers comprising one or more di- or tri-acrylates; at least one photoinitiator; and at least one surfactant, wherein the overprint composition has a viscosity ranging from about 50 cP to about 300 cP at about 25° C., an oligomer:monomer ratio is about 2.5 to about 1, and a surface tension ranging from about 15 to about 40 dynes/cm at about 25° C. The application also describes a method of protecting a toner-based image, comprising: providing an overprint composition; coating the overprint composition onto a substrate having a toner-based image thereon; and exposing the coated image to a radiation source for sufficient time to at least substantially cure the radiation curable components of the overprint composition, wherein the overprint composition comprises about 60 to about 70% of a polyether acrylate oligomer, about 20 to about 40% of a propoxylated$_2$ neopentyl glycol diacrylate, about 2.0 to about 7.0% of a ultraviolet light photoinitiator, and about 0.1 to about 1.0% of a surfactant, wherein the oligomer:monomer ratio is about 1.5:1 to about 4:1.

The appropriate components and process aspects of the foregoing, such as the composition components and methods, may be selected for the present disclosure in embodiments thereof. The entire disclosures of the above-mentioned application is totally incorporated herein by reference.

REFERENCES

Known methods of reducing document offset include adding wax to the toner and applying an overprint coating to the substrate. The overprint coating, often referred to as an overprint varnish or composition, is typically a liquid film coating that may be dried and/or cured. Curing may be accomplished through drying or heating or by applying ultraviolet light or low voltage electron beams to polymerize (crosslink) the components of the overcoat. However, known overprint coatings, such as those described in U.S. Pat. Nos. 4,070,262, 4,071,425, 4,072,592, 4,072,770, 4,133,909, 5,162,389, 5,800,884, 4,265,976, and 5,219,641, for example, fail to adequately protect xerographic prints and fail to reduce document offset.

The disclosures of each of the foregoing patents are hereby incorporated by reference herein in their entireties. The appropriate components and process aspects of the each of the foregoing patents may also be selected for the present compositions and processes in embodiments thereof.

BACKGROUND

In conventional electrostatographic imaging, electrostatic latent images are formed on a surface by uniformly charging a charge retentive surface, such as a photoreceptor. The charged area is then selectively dissipated in a pattern of activating radiation corresponding to the original image. The latent charge pattern remaining on the surface corresponds to the area not exposed by radiation. Next, the latent charge pattern is visualized by passing the photoreceptor past one or more developer housings comprising toner, which adheres to the charge pattern by electrostatic attraction. The developed image is then fixed to the imaging surface or is transferred to a receiving substrate, such as paper, to which it is fixed by a suitable fusing technique, resulting in a xerographic print or toner-based print.

Although electrostatographic equipment is used worldwide, it possesses a significant disadvantage in that the energy consumption is quite high. Thus, equipment with lower power consumption has been designed. Toners that function in the lower power consumption equipment, or that which meets the need for higher print speeds, are generally designed to have low glass transition temperatures ($T_g$'s) of for example about 55° C. to about 65° C. However, an image defect known as document offset (or "blocking") can occur at temperatures as low as about 54° C. to as high as about 70° C. or more when the toner begins to flow. Thus, low-melt toners often have a significant document offset problem.

In one situation, the document offset problem can be evident in the electrostatographic printing device and process itself. For example, at low glass transition temperatures of about 54° C. to about 65° C. and added pressure, such as typically occur where several reams of paper are located in the output tray of a printing machine, document offset in the printed papers can occur. This document offset can be in the form of toner sticking to the paper of the sheet above it or, in the case of duplex printing, toner sticking to toner on the sheet above it. The result is two sheets of printer paper that have to be pulled apart or, in the worst case, toner on one sheet pulls off either toner or paper fibers from the sheet above or below it, resulting in less desirable print quality. Similar document offset problems can also occur after the printing process is complete, such as during the lifetime of the printed document.

Document offset problems can be exacerbated when the printed items may be subjected to higher than normal environmental conditions. Thus, for example, a printed sheet of paper that is expected to stay within an office or home environment (such as near room temperature of about 20° C. to about 25° C.) may not exhibit document offset. However, a printed sheet of paper that is expected to be subjected to higher temperatures, such as documents kept in the glove compartment or passenger compartment of an automobile (where temperatures can regularly exceed about 40 to about 60° C.) may exhibit substantial document offset. For example, one standard for such printed materials as automobile manuals requires that the printed material survives a temperature of 70° C. for four hours.

Known methods of reducing document offset include adding wax to the toner and applying an overprint coating to the substrate. However, as described above, known overprint coatings fail to adequately protect xerographic prints and fail to reduce document offset. In addition, known coating formulations fail to prevent the formation of hairline cracks on the print surface in response to thermal expansion of the toner, which creates an undesirable appearance. This is a particularly important issue for automobile manuals, book covers, etc., which require the prints therein to survive high temperatures for hours at a time, yet retain a neat appearance.

Accordingly, a need exists for a protective composition that provides overprint coating properties including, but not limited to, thermal and light stability and smear resistance, coefficient of friction (slip), abrasion resistance, particularly in commercial print applications. The protective composition can be applied, for example, to a printed image formed by electrostatographic imaging methods, ink jet methods, or the like. More specifically, a need exists for an overprint coating that has the ability to wet over silicone fuser oil (generally found on xerographic substrates), permit overwriting, reduce or prevent thermal cracking, reduce or prevent document offset, and protect an image from sun, heat, etc. The compositions and processes of the present disclosure, wherein a xerographic print is coated with a radiation curable overprint composition, satisfy this need.

SUMMARY

The present disclosure is directed to overprint compositions and methods for overcoating, and thus protecting, electrostatographic prints. The compositions reduce document offset at temperatures up to, for example, at least about 70° C., such as from 70 to about 100° C., and reduce or prevent thermal cracking. In addition, the overprint compositions improve the overall appearance of xerographic prints due to the ability of the compositions to fill in the roughness of xerographic substrates and toners, thereby forming a level film and enhancing glossiness. This is desirable in reducing or eliminating differential gloss that is often observed when different pile heights of toner are applied to make a color image, for example. It is especially noticeable when a black portion of an image is adjacent to a nearly white portion of the image. With the overprint composition applied, the difference is negligible or less noticeable.

The present disclosure is directed to overprint compositions and methods for overcoating electrostatographic prints, where residual amounts of silicone oil are present on the print substrate. Silicone oils are typically used, for example, as a fuser release agent in electrostatographic printing, and as such small amounts of the oil remain on the printed substrate. Such printed substrates are difficult to coat, for example, because most coating compositions do not adequately wet silicone-containing images. However, the compositions and methods of this disclosure adequately wet silicone-containing images, and thus allow the silicone-containing images to be overcoated to provide various of the above-described benefits.

The disclosure further relates to electrostatographic prints comprising an ultraviolet (UV) curable overprint composition applied to at least one surface of the print, such as applied to the top of the substrate and/or the fused-toner image. The UV curable composition comprises a homogeneous mixture of UV curable polyester polyol derived oligomers, photoinitiators, and surfactants. By coating an electrostatographic print with the disclosed composition, the toner is effectively buried beneath an overcoat, which essentially forms a protective barrier on the print preventing undesirable toner-to-toner and toner-to-substrate interactions.

In an embodiment, the present disclosure provides a composition, comprising:

at least one radiation curable (alkyl)acrylate-polyester oligomer;

at least one photoinitiator; and at least one surfactant;

wherein the composition has a viscosity of from about 50 cP to about 3000 cP at about 25° C., and a surface tension of from about 15 to about 40 dynes/cm at about 25° C.

Also provided is a method of protecting a toner-based image, comprising:

coating the above composition onto a substrate having a toner-based image thereon; and exposing the coated image to a radiation source for sufficient time to at least substantially cure the radiation curable components of the composition.

In another embodiment, the present disclosure provides a system for creating a toner-based image, comprising: a photoconductive imaging member, a toner, an overprint composition, silicone oil, and a substrate, wherein the overprint composition comprises:

at least one radiation curable (alkyl)acrylate-polyester oligomer;

at least one photoinitiator; and at least one surfactant;

wherein the composition has a viscosity of from about 50 cP to about 3000 cP at about 25° C., and a surface tension of from about 15 to about 40 dynes/cm at about 25° C.

Embodiments

The present disclosure provides a radiation curable overprint compositions comprising a radiation curable oligomer, at least one photoinitiator, and at least one surfactant. The radiation curable oligomer comprises a radiation curable, such as UV curable, polyester polyol derived oligomer, or a mixture of two or more such radiation curable, such as UV curable, polyester derived polyol oligomers.

In the uncured state, the composition is a low viscosity liquid, such as having a viscosity of about 230 cp, although the viscosity is not limited. Upon exposure to a suitable source of curing energy, such as ultraviolet light, electron beam energy, or the like, the photoinitiator absorbs the energy and sets into motion a reaction that converts the liquid composition into a cured overcoat. The oligomer in the composition contains functional (acrylate) groups that polymerize during exposure to the curing source and readily crosslink forming a polymer network. This polymer network provides electrostatographic prints with, for example, thermal and light stability and smear resistance. Thus, the composition is particularly well-suited for coating images on substrates subjected to heat and sunlight since the composition protects the image from cracking and fading, and provides image permanence. The composition is also particularly well-suited for coating images on substrates that are subjected (post cure) to high temperature environments, such as environments having temperatures of about 50° C. to about 100° C. such as about 60° C. or about 70° C. to about 80° or about 90° C. In addition, the compositions reduce or prevent document offset in such high temperature environments, and thus can be used on prints containing low-melt toners.

Another advantage of the overprint compositions is its ability to be applied to substrates that contain amounts of silicon oil, such as is typically present in or applied to fuser rolls in electrostatographic printing machines. For example, the presence of the at least one surfactant in the compositions lowers the surface tension of the coating to allow wetting of the fuser-oiled substrates.

Overprint Compositions

The overprint compositions comprise, in general, at least one radiation curable oligomer, at least one photoinitiator, and at least one surfactant. The radiation curable oligomer comprises a radiation curable, such as UV curable, polyester polyol derived oligomer, or a mixture of two or more such radiation curable, such as UV curable, polyester polyol derived oligomers. The term "polyester polyol derived oligomer" refers, for example, to polyester polyol oligomers that are modified with other functional groups, such as (alkyl) acrylate groups, halogens, heteroatoms, other alkyl groups, aryl groups, amino groups, or the like. More specifically, the overprint compositions comprise at least one (alkyl)acrylate-modified polyester oligomer, at least one UV-photoinitiator used to initiate the photopolymerization (curing) of the at least one (alkyl)acrylate-modified polyester oligomer, and at least one surfactant. The term "(alkyl)acrylate-modified" refers, for example, to the use of acrylate or alkylacrylate as a modifying group for the polyester polyol. For example, the term "(meth)acrylate" refers to the use of acrylate or methacrylate as a modifying group for the polyester polyol.

In an embodiment, the (alkyl)acrylate-modified polyester oligomer can be used as the only polymerizable monomer or oligomer in the composition. In these oligomers, the alkyl group, when present, can be of any suitable chain length such as from one to about 40 carbon atoms, such as from 1 to about 20 or from 1 to about 10 carbon atoms, including methyl, ethyl, propyl, and the like, and where the alkyl group can be linear or branched and can be unsubstituted or substituted, for example, by halogens, heteroatoms, other alkyl groups, aryl groups, amino groups or the like. In such embodiments, the (alkyl)acrylate-modified polyester oligomer can be used singly, or in a mixture of two or more (alkyl)acrylate-modified polyester oligomers, as desired. In other embodiments, the (alkyl)acrylate-modified polyester oligomer or a mixture of two or more such (alkyl)acrylate-modified polyester oligomers can be used in combination with other suitable polymerizable monomer(s) or oligomer(s), to achieve specific desired properties.

The (alkyl)acrylate-modified polyester oligomer can be formed, for example, by reacting (alkyl)acrylic acid with a polyester. For example, a (meth)acrylate-modified polyester can be prepared by reacting (meth)acrylic acid with a polyester prepolymer or polymer that is obtained from polyol such as ethylene glycol or 1,6-hexanediol and polybasic acid such as phthalic acid or adipic acid. Such (alkyl)acrylate-modified polyester oligomers such as (meth)acrylate-modified polyester oligomer can be prepared as such, or can be obtained from various commercial sources. For example, various commercially available (meth)acrylate-modified polyester oligomers include EB80, EB81, EB83, EB800, EB809, EB810, EB1870, and EB2870 (available from Cytec Surface Specialties), and CN292 or CN704 (available from Sartomer Company Inc.). Of course, other oligomers can also be used.

In embodiments, the (alkyl)acrylate-modified polyester oligomer can have a single (alkyl)acrylate group, or it can be multi-functional by having more than one such group. For example, the (meth)acrylate-modified polyester oligomer can have two or more (meth)acrylate groups, such as two to about ten or more, or two to about five. In embodiments, the (meth) acrylate-modified polyester oligomer can have, on average, about two and a half to four (meth)acrylate groups. Exemplary multi-functional (meth)acrylate-modified polyester oligomers include those commercially available from Cytec Surface Specialties under the trade name Ebecryl (Eb): Eb40 (tetrafunctional acrylated polyester oligomer), Eb80 (polyester tetra-functional (meth)acrylate oligomer), Eb81 (multifunctional (meth)acrylated polyester oligomer), Eb600 (bisphenol A epoxy di(meth)acrylate), Eb605 (bisphenol A epoxy di(meth)acrylate diluted with 25% tripropylene glycol di(meth)acrylate), Eb639 (novolac polyester oligomer), Eb2047 (trifunctional acrylated polyester oligomer), Eb3500 (difunctional bisphenol-A oligomer acrylate), Eb3604 (multifunctional polyester acrylate oligomer), Eb6602 (trifunctional aromatic urethane acrylate oligomer), EBB301 (hexafunctional aliphatic urethane acrylate), Eb8402 (difunctional aliphatic urethane acrylate oligomer), and mixtures thereof.

In embodiments, the (meth)acrylate-modified polyester oligomer has an average molecular weight (Mw) of from about 400 to about 4000, although other materials can also be used.

An (alkyl)acrylate-modified polyester oligomer can also function as a viscosity reducer, as a binder when the composition is cured, and as an adhesion promoter, and as a crosslinking agent, for example. Suitable oligomers can possess a low molecular weight, low viscosity, and low surface tension and comprise functional groups that undergo polymerization upon exposure to UV light.

The overprint compositions also comprise at least one photoinitiator, such as at least one UV-photoinitiator. The photoinitiator is selected to initiate the photopolymerization (curing) of the at least one (meth)acrylate-modified polyester oligomer upon exposure to the activating energy. In an embodiments, the photoinitiator or mixture of photoinitiators can be included in any suitable and effective amount, such as about 3 to about 6% by weight, although other amounts can be used.

Suitable photoinitiators are UV-photoinitiators, including, for example, hydroxycyclohexylphenyl ketones, benzoins, benzoin alkyl ethers, benzophenones, trimethylbenzoylphenylphosphine oxides, azo compounds, anthraquinones and substituted anthraquinones, such as, for example, alkyl substituted or halo substituted anthraquinones, other substituted or unsubstituted polynuclear quinones, acetophones, thioxanthones, ketals, acylphosphines, and mixtures thereof. In these compounds, the alkyl groups can have any suitable chain length of, for example, 1 to about 40 carbon atoms, can be linear or branched, and can be unsubstituted or substituted such as by halogens, heteroatoms, other alkyl groups, aryl groups, or the like. Specific suitable photoinitiators include, for example, a hydroxyclyclohexylphenyl ketone, such as, for example, 1-hydroxycyclohexylphenyl ketone, such as, for example, Irgacure® 184 (Ciba-Geigy Corp., Tarrytown, N.Y.); a trimethylbenzoylphenylphosphine oxide, such as, for example, ethyl-2,4,6-trimethylbenzoylphenylphosphinate, such as, for example, Lucirin® TPO-L (BASF Corp.); and mixtures thereof.

The overprint compositions also comprise at least one surfactant. The surfactant is generally used to lower the surface tension of the composition to allow wetting and leveling of the substrate surface, if necessary, before curing. The surfactant is advantageously used for compositions that are applied to fuser oil-wetted substrates, because the surfactant can lower the surface tension of the coating to allow wetting of the fuser-oiled substrates. In an embodiment, the surfactant or mixture of surfactants can be included in any suitable and effective amount, such as about 2 to about 5% by weight, although other amounts can be used.

Any surfactant that has the capability of allowing an overprint varnish formulation to wet the fuser-oiled substrates may be used. Exemplary surfactants include, but are not limited to, fluorinated alkyl esters, polyether modified polydimethylsiloxanes, such as, for example, BYK®-UV3510 (BYK Chemie GmbH, Wesel, Germany), and BYK®-348 (BYK Chemie GmbH), such as, for example, BYK®-UV3510 (BYK Chemie GmbH, Wesel, Germany) and BYK®-348 (BYK Chemie GmbH), and fluorosurfactants, such as, for example, Zonyl® FSO-100 (E.I. Du Pont de Nemours and Co., Wilmington, Del.), having the formula $R_fCH_2CH_2O(CH_2CH_2O)_xH$, wherein $R_f$=$F(CF_2CF_2)_y$, x=0 to about 15, and y=1 to about 7.

Optional additives can also be included in the overprint composition, such as to provide their known effects. For example, suitable optional additives include light stabilizers, UV absorbers (which absorb incident UV radiation and convert it to heat energy that is ultimately dissipated), antioxidants, optical brighteners (which can improve the appearance of the image and mask yellowing), thixotropic agents, dewetting agents, slip agents, foaming agents, antifoaming agents, flow agents, silica, waxes, oils, plasticizers, binders, electrical conductive agents, fungicides, bactericides, organic and/or inorganic filler particles, leveling agents (such as agents that create or reduce different gloss levels), opacifiers, antistatic agents, dispersants, colorants (such as pigment, dye, mixtures of pigment and dye, mixtures of pigments, mixtures of dyes, and the like), and the like. The composition may also include an inhibitor, such as a hydroquinone, to stabilize the composition by prohibiting or, at least, delaying, polymerization of the oligomer and monomer components during storage, thus increasing the shelf life of the composition. However, additives may negatively effect cure rate, and thus care should be taken when formulating an overprint composition using optional additives.

The ability of the composition to wet the substrate generally depends on its viscosity and surface tension. For example, if the surface tension is low, then the surface area covered by the composition will be high resulting in sufficient wetting of the substrate. Exemplary composition formulations have a surface tension of from about 15 dynes/cm to about 40 dynes/cm, such as from about 18 dynes/cm to about 21 dynes/cm, as measured at about 25° C. A particular exemplary surface tension is about 21 dynes/cm as measured at about 25° C.

The viscosity of the compositions in embodiments can be for example, from about 50 cP to about 3000 cP at a temperature ranging from about 20° C. to about 30° C. such as 25° C. In embodiments, an exemplary viscosity is about 200-230 cP at about 25° C.

The composition components can be mixed together in any suitable ratios to provide an overprint composition, depending upon particular desired properties. For example, in embodiments the components can be mixed together in the following order: about 60 to about 97% oligomer including, but not limited to, a polyester polyol derived oligomer such as a (meth)acrylate-modified polyester oligomer, such as about 80 to about 95% oligomer, or about 85 to about 94% oligomer, or about 91.5 to about 92.5% oligomer; about 2 to about 7% UV-photoinitiator, such as about 3 to about 6% or about 4.5 to about 5.5% or about 5.1% UV-photoinitiator; and about 0.05 to about 5% surfactant, such as about 1 to about 4% or about 2 to about 4% such as about 3% surfactant. Where two or more oligomers are included, such as two or more polyester polyol derived oligomers such as (meth)acrylate-modified polyester oligomers, there can be included in any suitable mutual ratio. For example, where two such polyester polyol derived oligomers are included, they can be included in a ratio of 1:10 to about 1:1, such as about 1:5 to about 1:2 or about 1:4 to about 1:3. In an embodiment, the components can be mixed together in the following order: about 91.2% oligomer polyester polyol derived oligomer, comprising a mixture of two oligomers such as about 23% amine modified polyester acrylate oligomer EB80 (Cytec Surface Specialties) and about 68.9% amine modified polyester tetraacrylate EB81 (Cytec Surface Specialties); about 5.1% UV-photoinitiator, comprising a mixture of two UV-photoinitiators such as about 4.8% IRGACURE 184® (Ciba) and about 0.3% Lucirin TPO-L; and about 3% surfactant, such as about 3% BYK-UV3510® (BYK Chemie GmbH). All percents here are percents by weight unless otherwise noted.

In preparing the overprint composition, the components can be mixed and combined together in any desired order and under any suitable conditions. For example, in embodiments, the components can be mixed together by first adding or mixing the polyester oligomer(s), followed by addition and mixing of the UV-photoinitiator(s), followed by addition and mixing of the surfactant(s). in between each addition, the composition can be stirred, as necessary, to ensure desired or full dissolution of each component. Other optional additives can also be added and mixed, as appropriate. For example, the components cam be combined and mixed with brief agitation using, for example, a magnetic stir bar or overhead mixer between each addition, followed by at least about two hours of stirring until the oligomer(s) and UV-photoinitiator(s) are dissolved. The formulation can be heated to reduce viscosity, if necessary. The resulting formulation may be filtered if necessary.

Overprint Composition Application Methods

The overprint composition can be applied to any type of substrate, such as, for example, paper, including wherein the substrate has a residue of fuser-oil (such as functionalized silicone oil), to completely wet the surface. The substrate can contain additives including, but not limited to, anti-curl compounds, such as, for example, trimethylolpropane; biocides; humectants; chelating agents; and mixtures thereof; and any other optional additives known in the art for enhancing the performance and/or value of the toner and/or substrate.

The composition can be applied to the substrate at any suitable time after image formation. For example, the composition can be applied to the substrate immediately after the image is formed, such as in an inline coating apparatus where the printing and overcoating are conducted by the same printing device, of after a short or long delay after printing, such as in an offline coating apparatus where the printing and overcoating are conducted by different printings devices. Furthermore, the coating composition can be applied over the entire substrate, the entire image, parts of the substrate, or parts of the image. For example, the composition can be applied to both imaged areas and non-imaged areas, it can be applied only to imaged areas, or it can be applied only to non-imaged areas. In exemplary embodiments, the composition is applied over the entire substrate, including toner imaged and non-imaged areas, to provide more uniform gloss and surface properties. The toner-based image on the substrate desirably has been previously prepared by any suitable xerographic process comprising, for example, generating an electrostatic image, developing the electrostatic image with toner, and transferring the developed toner-based image to a substrate, or modifications thereof, known in the art of xerography.

More specifically, methods for generating images coated with the overprint compositions disclosed herein comprise: generating an electrostatic latent image on a photoconductive imaging member, developing the latent image with toner, transferring the developed electrostatic image to a substrate, coating the substrate or parts thereof and/or image or parts thereof with an overprint composition, and curing the composition. Development of the image can be achieved by a number of methods known in the art, such as, for example, cascade, touchdown, powder cloud, magnetic brush, and the like. Transfer of the developed image to the substrate can be by any method, including, but not limited to, those making use of a corotron or a biased roll. The fixing can be performed by means of any suitable method, such as, for example, flash fusing, heat fusing, pressure fusing, vapor fusing, and the like. Suitable imaging methods, devices, and systems are known in the art and include, but are not limited to, those described in U.S. Pat. Nos. 4,585,884, 4,584,253, 4,563,408, 4,265,990, 6,180,308, 6,212,347, 6,187,499, 5,966,570, 5,627,002, 5,366,840; 5,346,795, 5,223,368, and 5,826,147, the entire disclosures of which are incorporated herein by reference.

Conventional liquid film coating devices can be used for applying the overprint composition, including, but not limited to, roll coaters, rod coaters, blades, wire bars, air-knives, curtain coaters, slide coaters, doctor-knives, screen coaters, gravure coaters, such as, for example, offset gravure coaters, slot coaters, and extrusion coaters. Such devices can be used in their conventional manner, such as, for example, direct and reverse roll coating, offset gravure, curtain coating, lithographic coating, screen coating, and gravure coating. In an embodiment, coating and curing of the composition are accomplished using a two or three roll coater with a UV curing station. Typical composition deposition levels, expressed as mass per unit area, can be from about 1 $g/m^2$ to about 10 $g/m^2$, such as about 5 $g/m^2$.

The energy source used to initiate crosslinking of the radiation curable oligomer and monomer components of the composition can be actinic, such as radiation having a wavelength in the ultraviolet or visible region of the spectrum, accelerated particles, such as electron beam radiation, thermal such as heat or infrared radiation, or the like. In embodiments, the energy is actinic radiation because such energy provides excellent control over the initiation and rate of crosslinking. Suitable sources of actinic radiation include, but are not limited to, mercury lamps, xenon lamps, carbon arc lamps, tungsten filament lamps, lasers, sunlight, and the like.

Ultraviolet radiation, especially from a medium pressure mercury lamp with a high speed conveyor under UV light, such as about 20 to about 70 m/min., can be used in embodiments, wherein the UV radiation is provided at a wavelength of about 200 to about 500 nm for about less than one second, although the disclosure is not limited thereto. In embodiments, the speed of the high speed conveyor can be about 15 to about 35 m/min. under UV light at a wavelength of about 200 to about 500 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, and a cooling system to remove heat from the UV light source.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Overprint Composition Formulation

The components of the overprint composition were combined in the following order with brief agitation between each addition with a magnetic stir bar: 23.0% Amine Modified Polyester Tetracrylate EB80 (Cytec Surface Specialties), 68.9% Amine Modified Polyester Acrylate EB81 (Cytec Surface Specialties), 4.8% UV photoinitiator 1-hydroxyclyclohexylphenyl ketone Irgacure® 184 (Ciba-Geigy Corp.), 0.3% UV photoinitiator ethyl-2,4,6-trimethylbenzoylphenylphosphinate Lucirin® TPO-L (BASF Corp.), and 3.0% surfactant polyether modified polydimethylsiloxane BYK®-UV3510 (BYK Chemie GmbH). The mixture was stirred at room temperature for at least two hours at high shear until the UV photoinitiator fully dissolved.

The overprint composition was coated on a variety of xerographic prints at a thickness of about 5 microns. The composition was subsequently cured using a H-lamp (electrodeless) at about 20 m/min.) and a UV wavelength of about 200 to about 500 nm. In this Example the overprint composition was applied on top of the functionalized silicon oil that is filmed on the sheet after the sheet passes through a two-roll fuser. The overprint composition adequately wetted the surface with no surface reaction.

The document offset of the samples produced exceeded 70° C. at 50% relative humidity. The document offset of the samples was rated 4.5. In this test a rating of 5 is given for no adhesion and no damage; a rating of 4.5 is given for partial adhesion but no damage; a rating of 4 is given for partial adhesion and very minor damage; a rating of 3.5 is given for adhesion and minor damage; a rating of 2 is given for adhesion and damage to ⅓ to ½ of the area; a rating of 1 is given for adhesion and damage to more than ½ of the area; and a rating of 0 is given for paper failure, where a rating of 4 or higher is a passing score, and a rating of less than 4 is generally unacceptable. Document offset properties of various conventional toners are set forth in the following Table for comparison.

| Comparative Example | Machine Name | Temperature where Document Offset = 4.0 at 10 $g/cm^2$ |
|---|---|---|
| 1 | Nuvera | >>65° C. |
| 2 | DC265 | >>65° C. |
| 3 | Phaser 7700 | 72° C. |
| 4 | DC2060 & DC12 | 62° C. |
| 5 | DC40 | 61° C. |
| 6 | DT180 | 55.5° C. |
| 7 | IGen3 | 55.5° C. |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A xerographic print, comprising:

a substrate with a toner-based image thereon, and an overprint composition coated over at least the toner-based image, wherein the overprint composition before curing has a viscosity of from about 50 cP to about 3000 cP at about 25° C. and a surface tension of from about 15 to about 40 dynes/cm at about 25° C. and comprises:

at least one radiation curable (alkyl)acrylate-polyester oligomer, at least one photoinitiator, and at least one surfactant, wherein, after curing, the xerographic print resists document offset up to about 100° C.

2. The xerographic print of claim 1, wherein the toner based image has residual release oil present on the image.

3. The xerographic print of claim 2, wherein the release oil is a silicone oil.

4. The xerographic print of claim 1, wherein the overprint composition before curing comprises two or more different radiation curable (meth)acrylate-modified polyester oligomers.

5. The xerographic print of claim 1, wherein the at least one radiation curable (alkyl)acrylate-polyester oligomer comprises an amine modified polyester acrylate oligomer or an amine modified polyester tetraacrylate oligomer.

6. The xerographic print of claim 1, wherein the radiation curable (meth)acrylate-modified polyester oligomer is a multi-functional (meth)acrylate-modified polyester oligomer.

7. The xerographic print of claim 1, wherein the radiation curable (meth)acrylate-modified polyester oligomer has a weight average molecular weight of from about 400 to about 4,000.

8. The xerographic print of claim 1, wherein the photoinitiator is selected from the group consisting of hydroxycyclohexyiphenyl ketones, trimethylbenzophenones, polymeric hydroxy ketones, trimethylbenzoylphenylphosphine oxides, and mixtures thereof.

9. The xerographic print of claim 1, wherein the photoinitiator is 1-hydroxycyclohexylphenyl ketone.

10. The xerographic print of claim 1, wherein the photoinitiator is a mixture of 1-hydroxycyclohexylphenyl ketone and ethyl-2,4,6-trimethylbenzoylphenylphosphinate.

11. The xerographic print of claim 1, wherein the photoinitiator comprises two to five different photoinitiators.

12. The xerographic print of claim 1, wherein the surfactant is a polyether modified polydimethylsiloxane or a fluorosurfactant.

13. The xerographic print of claim 1, wherein the surfactant comprises two to five different surfactants.

14. The xerographic print of claim 1, wherein the overprint composition before curing comprises about 60 to about 97 wt % of the (meth)acrylate-modified polyester oligomer, about 2 to about 7 wt % of the photoinitiator, and about 0.05 to about 5 wt % of the surfactant.

15. The xerographic print of claim 1, wherein the overprint composition before curing comprises about 85 to about 94% of the (meth)acrylate-modified polyester oligomer, about 3 to about 6% of the photoinitiator, and about 2 to about 4% of the surfactant.

16. The xerographic print of claim 1, the overprint composition before curing further comprising an additive selected from the group consisting of light stabilizers, UV absorbers, antioxidants, optical brighteners, thixotropic agents, dewetting agents, slip agents, foaming agents, antifoaming agents, flow agents, waxes, silica, oils, plasticizers, binders, electrical conductive agents, fungicides, bactericides, organic and inorganic filler particles, leveling agents, opacifiers, antistatic agents, dispersants, and colorants.

17. A method of making a xerographic print, comprising:

providing a substrate with a toner-based image thereon, and coating at least the toner-based image with an overprint composition, wherein the overprint composition before curing has a viscosity of from about 50 cP to about 3000 cP at about 25° C. and a surface tension of from about 15 to about 40 dynes/cm at about 25° C. and comprises:

at least one radiation curable (alkyl)acrylate-polyester oligomer, at least one photoinitiator, and at least one surfactant, and exposing the coated image to a radiation source for sufficient time to substantially cure the radiation curable components of the composition.

18. The method of claim 17, wherein the substrate having a toner-based image thereon further comprises residual release oil.

19. The method of claim 17, wherein the release oil is a silicone oil.

20. The method of claim 17, wherein the radiation source is an ultraviolet light.

21. The method of claim 17, wherein the exposing comprises irradiating the coated image with ultraviolet radiation at a wavelength of about 200 to about 500 nm at a speed of about 20 to about 70 m/min. for about less than one second.

22. The method of claim 17, wherein the providing comprises:

providing a substrate, and forming a toner-based image on the substrate by an electrographic process that utilizes silicone oil as a release agent.

* * * * *